US009329855B2

(12) United States Patent
Zamir et al.

(10) Patent No.: US 9,329,855 B2
(45) Date of Patent: May 3, 2016

(54) DESKTOP IMAGE MANAGEMENT FOR VIRTUAL DESKTOPS USING A BRANCH REFLECTOR

(71) Applicant: VMware, Inc., Palo Alto, CA (US)

(72) Inventors: Tal Zamir, Haifa (IL); Leonid Vasetsky, Zikhron Yaakov (IL)

(73) Assignee: VMware, Inc., Palo Alto, CA (US)

( * ) Notice: Subject to any disclaimer, the term of this patent is extended or adjusted under 35 U.S.C. 154(b) by 17 days.

(21) Appl. No.: 14/176,004

(22) Filed: Feb. 7, 2014

(65) Prior Publication Data

US 2015/0227357 A1    Aug. 13, 2015

(51) Int. Cl.
*G06F 9/445*  (2006.01)
*G06F 9/455*  (2006.01)
*H04L 29/06*  (2006.01)

(52) U.S. Cl.
CPC .. *G06F 8/65* (2013.01); *G06F 8/63* (2013.01); *G06F 9/45533* (2013.01); *H04L 67/42* (2013.01)

(58) Field of Classification Search
CPC ......... G06F 8/63; G06F 8/65; G06F 9/45533; H04L 67/42
USPC ........................................................ 717/173
See application file for complete search history.

(56) References Cited

U.S. PATENT DOCUMENTS

| | | | | |
|---|---|---|---|---|
| 8,112,505 | B1* | 2/2012 | Ben-Shaul et al. | 709/219 |
| 8,117,554 | B1* | 2/2012 | Grechishkin et al. | 715/764 |
| 8,301,874 | B1 | 10/2012 | Heidingsfeld et al. | |
| 8,656,386 | B1 | 2/2014 | Baimetov et al. | |
| 2008/0209414 | A1 | 8/2008 | Stein | |
| 2011/0029968 | A1* | 2/2011 | Sanders et al. | 717/178 |
| 2012/0284632 | A1* | 11/2012 | Baird | 715/749 |
| 2013/0212161 | A1* | 8/2013 | Ben-Shaul et al. | 709/203 |
| 2013/0212579 | A1 | 8/2013 | Ben-Shaul et al. | |
| 2013/0219286 | A1 | 8/2013 | Ben-Shaul et al. | |

OTHER PUBLICATIONS

"VMware ThinApp User's Manual", VMware ThinApp 4.0.1, VMware, Inc., 2008, 176pg.*
"View Manager Administration Guide", View Manager 4.0, VMware, Inc., 2010, 230pg.*
"VMware View Architecture Planning Guide", View Manager 4.0.1, VMware, Inc., 2010, 58pg.*
"Workstation User's Manual", VMware Workstation 7.1, VMware, Inc., 2010, 514pg.*

* cited by examiner

*Primary Examiner* — Ryan Coyer

(57) ABSTRACT

A desktop image management system is described that can efficiently distribute updates to virtual desktops running on host servers in a data center. The system is comprised of a central server and multiple agents, each agent installed on a virtual machine. When a VM receives an update from the central server, the files are stored in a single instance store on the host server. Corresponding stub files (empty of content) are created on the VM for each file in the single instance store. The stub files are marked to indicate that the stub file is mapped to the single instance store. When the guest operating system requests to read the stub file, the virtual disk layer of the host server detects that the requested block has been marked and fetches the content of the file from the single instance store.

20 Claims, 9 Drawing Sheets

DESKTOP IMAGE MANAGEMENT FOR VIRTUAL DESKTOPS USING A BRANCH REFLECTOR

TECHNICAL FIELD

The present disclosure generally relates to virtual desktop image management and more particularly relates to techniques for modifying or updating software and other content on virtual machines that host virtual desktops.

BACKGROUND

Enterprise desktop management is one of the most challenging tasks for Information Technology (IT) departments of large organizations today. A typical IT department needs to manage, protect, and distribute software updates and modifications, upgrade operating systems and applications, as well as be able to back up and restore the user's data and settings on demand. One issue for IT departments is the complexity of managing a large number of different desktop instances that may exist on the computers of enterprise users. The sheer number of user computers to manage; the proliferation of operating system (OS) images and applications; and the complex set of operations, such as deployment, provisioning, patching, upgrading, installing and managing applications, compliance testing, troubleshooting and re-imaging; all make IT responsibilities a very challenging task. To compound these difficulties, today's enterprises are often dispersed over multiple geographic locations and the use of Local Area Networks (LANs) connected over one or more Wide Area Networks (WANs) with variable bandwidths and latencies is a serious barrier to providing efficient desktop management without sacrificing end user experience.

Virtual Desktop Infrastructure (VDI) can provide some aid to IT departments by virtualizing the desktops of individual end users. In a conventional VDI environment, each user in an enterprise is provisioned a virtual desktop and is allowed to access their virtual desktop over a remote network connection, such as a WAN connection. The virtual desktops are typically hosted on servers that reside in a data center of the enterprise (or a third party service provider), and each host server may execute multiple virtual desktops. Users can utilize a client device to remotely log into their individual virtual desktop and all of the application execution takes place on the remote host server which is linked to the local client device over a network using a remote display protocol, such as remote desktop protocol (RDP), PC-over-IP protocol (PCoIP), virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on a server hardware platform running a hypervisor.

VDI provides a more centralized and efficient client environment that is easier to manage by enterprise IT administrators, who are able to respond more quickly to the changing needs of the user and the business. However, many issues with desktop management still persist in the VDI environment. For example, the IT department often needs to distribute updates or install new software to all desktops in the enterprise as part of an upgrade or migration process. It is usually desirable to perform such distribution of updates while the users are using their desktops so as not to disrupt normal business operations. If such a distribution were to be performed in a conventional VDI model, all of such updates would need to be distributed and installed on each and every virtual desktop. However, because each server in a data center typically hosts many different virtual desktops that share the physical resources of the server, such distributions/installations are likely to overwhelm a server's physical resources and degrade the overall user experience. A more efficient approach is desirable for distributing updates within a VDI environment of an enterprise.

DETAILED DESCRIPTION

Figure 1:
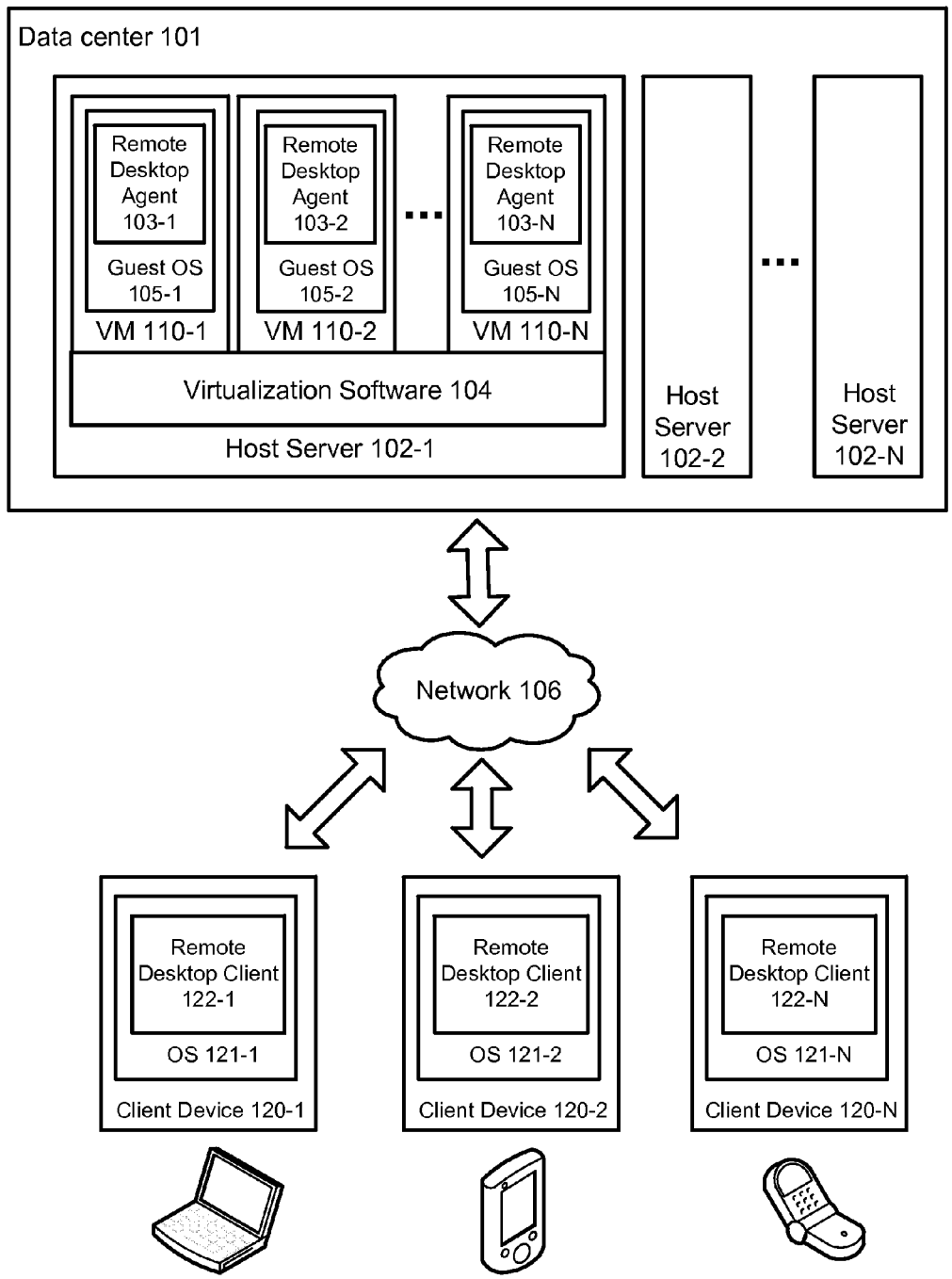
FIG. 1 illustrates an example of a virtual desktop infrastructure (VDI) environment, in accordance with various embodiments.

Systems and methods in accordance with various embodiments of the present disclosure overcome at least some of the above mentioned shortcomings and deficiencies by providing more efficient ways to manage virtual desktops in a virtualized desktop infrastructure (VDI) environment. In particular, embodiments described herein improve the efficiency of delivering updates, modifications and/or new software installations to virtual desktops that are executed on host servers in a data center.

As used herein, the terms "virtual desktop" and "desktop" refer to an instance of an operating system or application that runs remotely with respect to the user, e.g., on the host server system in a remote datacenter. In a conventional VDI environment, each virtual desktop corresponds to a virtual machine (VM) executed on a host server (i.e., a host computing device). A host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user that owns the virtual desktop can remotely log into their virtual desktop using a client device that establishes a network connection with the host server and remotely execute various applications on the virtual machine as if the desktop was running on the user's local client device.

Since multiple virtual machines are typically hosted on a single host server, all of the virtual machines on that server share the physical resources of that server, including but not limited to one or more central processing units (CPUs), random access memory (RAM), flash memory, disk, network interface card (NIC) and the like. The host server also usually includes a hypervisor or other virtualization software that manages all of the virtual machines and their access to the physical resources of the host server. When an IT department wishes to deploy a new application or distribute a software update to all users within an enterprise, the new application or update first needs to be transmitted to each user's virtual machine (i.e., all virtual desktops) and then each virtual machine needs to perform the installation or update. Because many virtual machines (e.g., tens, hundreds, etc.) may be sharing the resources of one host server, those resources can be overwhelmed, thereby leading to poor end user experience if the user happens to be using their virtual desktops during the update.

In various embodiments, the desktop image management system described herein can improve the performance and efficiency of such distribution of new or updated applications, operating systems or other software. The desktop image management system is comprised of an agent and a central server. The image management agent can be downloaded and installed on each virtual machine that executes the virtual desktop for an individual user. Alternatively, to make the process of installing the agent easier, the agent can be distributed by adding the agent to a template of a virtual machine. In this case, the agent would be cloned upon each new VM creation. This makes the process of deploying the agent onto the endpoints easier since the agent does not need to be downloaded and installed on every virtual desktop. Once up and running on the VM, the agent is responsible for scanning the file system, registry and other information of the virtual machine that comprise the desktop image of the user and for transmitting copies of all of this information to the central server. This initial transmission of the desktop image information is referred to herein as "centralization". In various embodiments, to optimize the centralization process, the agent may only transmit those files and information (e.g., blocks) to the central server which are not already available on the central server. The central image management server is responsible for storing desktop images for each virtual machine in the enterprise. In addition, the central server provides a console that enables an IT administrator to distribute software updates to each agent that is installed on an endpoint virtual machine. In some embodiments, the software update to be distributed to an individual virtual machine may comprise an application layer. An application layer is composed of a set of files and registry entries which need to be properly merged on the endpoint virtual machine in order to install a new application (or updated version of the application) on that virtual machine.

To improve efficiency of distribution of the software updates, each host server utilizes a single instance store which will contain any update or new application to be deployed on the virtual machines running on that host server. When an IT administrator uses the console of the central server to distribute an update (e.g., new application) to all virtual machines running on the host server, a single copy of all the files necessary for installing the new application are transmitted to the host server and stored in the single instance store. This eliminates the need to distribute the necessary files to each and every virtual machine running on that server individually. This reduces network traffic and storage requirements of the host server.

Once the host server receives the request to update a file, the content of the file is stored in the single instance store. Thereafter, all updating of the file to all virtual machines can be performed internally, on the host device, thereby reducing the overall network traffic in the data center. In one embodiment, to perform the update process, for each file in the single instance store, the virtual disk layer within the hypervisor on the host computing device creates a corresponding "stub" file on each virtual machine that is to be updated. As used herein, the term "stub file" refers to a file that is empty of content. In other words, the host server does not actually copy the content of the file stored in the central instance store into each and every VM but instead creates a stub file or dummy file on the disk of each virtual machine. Creating such stub files does not introduce a lot of input/output (I/O) operations on the server because the host server is simply marking the metadata in the file system to indicate that there is a file on the virtual machine but it does not write the actual content of that file to the virtual disk of the VM. After the stub files are created, the stub files are marked to indicate that those files actually do not have any content.

Subsequently, if the VM requests the content of the stub file, the hypervisor (i.e., virtual disk layer) of the host server will need to deliver the content on demand from the single instance store. When the agent on the VM completes the update operation, the files are still empty of content. However, when the user tries to use the application, the guest operating system installed on the VM will try to access a block of content of the stub file. The virtual disk layer will detect this access request and quickly fetch the requested block from the single instance store. Because this block is stored in the memory or fast-tier storage (e.g., SSD) of the host server (i.e., the single instance store), the fetching does not require the copying of any blocks and thus the operation can be performed very fast. As such, there is no need to actually copy the content of the file to the virtual machine disk file of the VM that requested the operation.

The result of this process is that the layer update operation is completed quickly—as it doesn't require the layer's content to be copied over and over again to each and every target VM (which would generate a lot of I/O). Instead, the techniques described herein only need to copy the content of each file once to each host server (to build the single instance store on that server). The rest of the process only requires creation of stub/empty files, which requires substantially less I/O resources (reduces impact on I/O, CPU and network resources of the entire virtual desktop infrastructure). Furthermore, the single instance store can be cached in more efficiently accessed memory, such as random access memory (RAM) or flash memory, so that fetching the blocks from that store is a rapid process.

FIG. 1 illustrates an example of a virtual desktop infrastructure (VDI) environment, in accordance with various embodiments. VDI environment includes host servers (102-1, 102-2, 102-N) that are communicatively coupled with a number of client devices (120-1, 120-2, 120-N) via a network 106. Network 106 may be a local area network (LAN), wide area network (WAN) or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as to not obscure salient features of the VDI environment. Host servers (102-1, 102-2, 102-N) may physically reside in a data center 101 of the enterprise or in a data center of a third party service provider.

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. As used herein, the term "desktop" refers to a computing environment in which a user can launch, interact with, and manage the user's applications, settings, and data. Each client device (120-1, 120-2, 120-N) can allow a user to view on a desktop graphical user interface (GUI) (via a local display device) his/her desktop that is running remotely on host server 102-1, as well as provide (via one or more local input devices) commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (GOS) (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. This type of remote desktop architecture where user desktops are hosted within separate, server-side virtual machines is referred to as virtual desktop infrastructure, or "VDI." Each client device (e.g., 120-1, 120-2, 120-N) can execute a remote desktop client application (e.g., 122-1, 122-2, 122-N). The interaction between the virtual desktop and the client device can be facilitated by the remote desktop client application (e.g., 122-1, 122-2, 122-N) running in the OS (e.g., 121-1, 121-2, 121-N) on the client device (e.g., 120-1, 120-2, 120-N) which communicates with a server-side remote desktop agent (e.g., 103-1, 103-2, 103-N) that is running on the guest OS inside the virtual machine (e.g., 110-1, 110-2, 110-N). In particular, the interaction can be performed by the remote desktop agent transmitting visual display information (e.g., framebuffer information) to the remote desktop client and the remote desktop client in turn transmitting user input events (e.g., keyboard, mouse events) to the remote desktop agent.

It should be noted that the particular VDI deployment illustrated in FIG. 1 is shown purely for purposes of illustration and is not intended to be in any way inclusive or limiting to the embodiments that are described herein. For example, a typical enterprise VDI deployment would include many more host servers which may be distributed over many data centers, which include many other types of devices, such as switches, power supplies, cooling systems and other environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
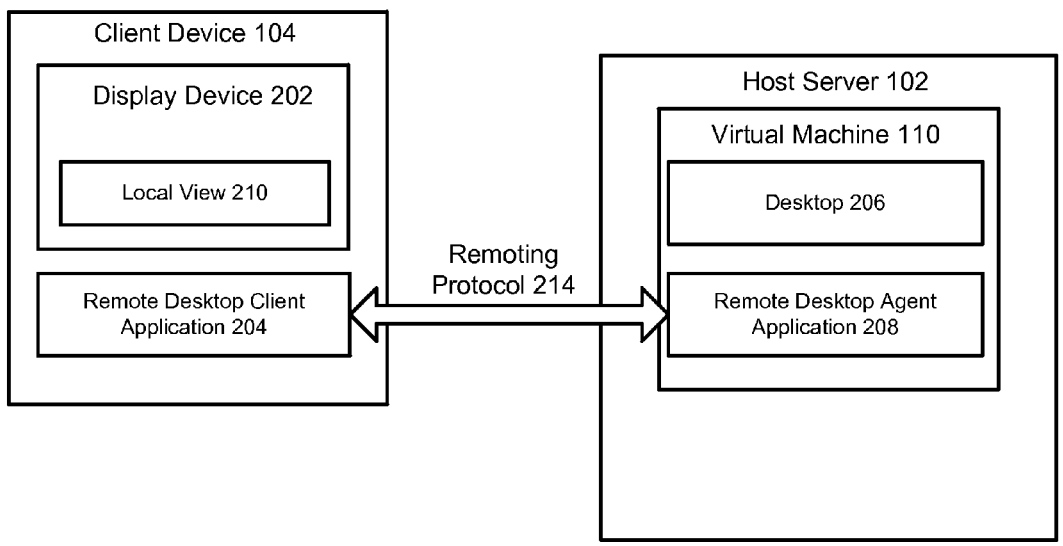
FIG. 2 provides a more detailed example of virtual desktop environment for a particular client device and a particular VM according to various embodiments.

FIG. 2 provides a more detailed example of virtual desktop environment for a particular client device 104 and a particular VM 110 according to various embodiments. As previously described and illustrated in this figure, client device 104 includes a remote desktop client application 204 and VM 110 includes a corresponding remote desktop server-side agent application 208. Remote desktop client application 204 and remote desktop agent application 208 can communicate via a remoting protocol 214 to enable the remote virtual desktop features described above with reference to FIG. 1.

Remote desktop agent application 208 can capture images of a desktop 206 running within VM 110 and send, via remoting protocol 214, the desktop images to remote desktop client application 204. For example, using VNC protocol, the desktop image information contained in the framebuffer on the server system 102 can be encoded and transmitted to the remote desktop client application 204 on the client device 104. The framebuffer is a portion of memory containing the information used to display the pixels on the display screen. Remote desktop client application 204 can process the received desktop images (e.g., the encoded framebuffer) to update a part of the desktop GUI that is presenting a local view 210 of desktop 206 on client device 104. The desktop GUI is displayed on one or more display devices 202 (only one shown). Therefore, the desktop GUI presents a local view 210 of desktop 206 to a user of client device 104 on display device 202.

Remote desktop client application 204 can receive user inputs directed to desktop 206 and forward the user inputs, via the remoting protocol 214, to remote desktop agent application 208. The user inputs can be received on the desktop GUI that is presenting local view 210. As the visual state of desktop 206 changes (either in response to the user inputs or due to activity initiated by applications/processes running on desktop 206), remote desktop agent application 208 can update the desktop images that are sent to remote desktop client application 204 (e.g., by transmitting updated framebuffer information) to reflect those changes in real-time or dynamically by updating local view 210 on display device 202, e.g., immediately upon the changes being generated at desktop 206.

Figure 3:
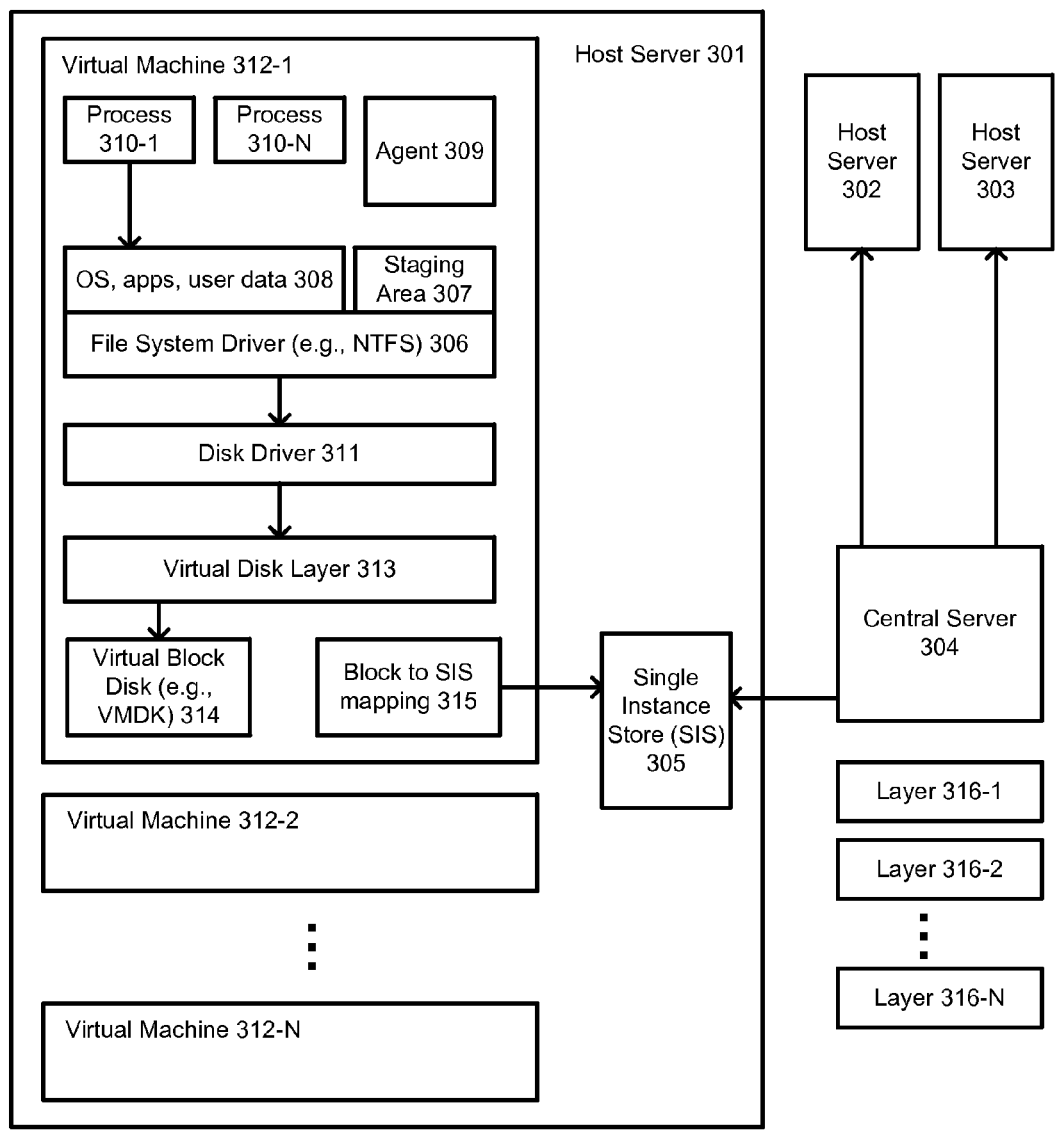
FIG. 3 illustrates an example of a system for managing virtual desktop images, in accordance with various embodiments.

FIG. 3 illustrates an example of a system for managing virtual desktop images, in accordance with various embodiments. In various embodiments, the system for managing the virtual desktop images can be comprised of a central desktop image management server 304 and a desktop management agent 309 that is installed on each virtual machine running a virtual desktop. When the agent 309 is first executed on the virtual machine (e.g., 312-1), the agent 309 performs an initial centralization process by scanning the contents of the local file system in the virtual machine 312-1 and uploading any missing files (i.e., files which are not already available on the central server) to the central server. Once the centralization process is complete, the central server 304 contains a full image of the user's desktop, including the operating system, applications and user data 308. As such, the agent 309 is responsible for scanning/uploading the desktop image to the central server 304 and for merging any updates/layers with the content on the virtual machine. The central server 304 is responsible for storing the images of all endpoints (i.e., virtual machines) and for providing an administrator with a console to perform various operations (e.g., updates, new software deployments, etc.) on the client. The central server 304 stores all the desktop images in a single instance store in an efficient manner, without duplication of the same files or blocks. This helps optimize the storage space and network communications.

Once the initial centralization process is complete, the agent 309 is capable of performing various fixes, updates and new software installations on the virtual machine 312-1. For example, the IT administrator can use a console on the central server 304 to apply a new base layer or an application layer to the desktop image that the user has on their virtual machine 312-1. As used herein, the term "layer" is a set of files, registry entries and other databases (e.g., Windows-specific databases, etc.) that are necessary to be merged onto the virtual machine in order to apply a change to the virtual machine. A base layer contains all of the files, registry entries and databases required to run an operating system with a set of pre-defined applications, drivers and virtual devices on the virtual machine. An application layer, on the other hand, contains all of the files, registry entries and databases required to merge a new application (or an updated version of an existing application) on the virtual machine. The application layer may also include drivers and virtual devices.

When an administrator decides to apply a change to a target virtual machine using the console of the central server 304, the administrator can first create an application layer or a base layer (or select an existing layer). The administrator can then instruct the central server 304 to send the base or application layer to a virtual machine. The central server 304 has a full listing of the files on each target VM (i.e., the desktop image of that VM which it obtained from the agent) and the central server 304 also has a full listing of the files in the application layer. The server 304 also has the registry (e.g., Windows registry) of the target VM and the registry of the application layer. Based on the differences, the central server 304 determines which files are missing on the target VM and these files need to be downloaded from the server 304 in order to apply the layer. The downloading of the files can be performed by the agent running on the target VM or by an agent running on a different VM, as described later in this document. The delivery of the files can be performed in an optimized manner such that the agent 309 does not need to download those files which already exist locally on the target VM 312-1. Instead, the agent 309 determines which file blocks are needed on the target VM 312-1, downloads those particular blocks from the server 304 and stores the blocks into a side folder (i.e., staging area 307). Once the agent 309 has all the necessary files and registry entries of the app layer, the agent 309 is responsible for performing an offline merge of the content of the target virtual machine 312-1 with the content of the application layer (or base layer), as described in further detail below. In some embodiments, the end user may be required to restart the operating system on the virtual machine when the merge is completed.

When a base layer or application layer is applied to a set of VMs (e.g., VMs 312-1, 312-2, 312-N) on a host server 301, the central server first sends all the files and content of the layer to a single instance store (SIS) 305 residing in that host server 301. Each host server includes exactly one single instance store 305 and this single instance store 305 keeps a single copy of each unique file that will be utilized by the layers being applied to the virtual machines running on the host server 301. In alternative embodiments, rather than storing a single copy of each unique file, the single instance store may store each unique block of the files.

In some embodiments, the downloading and storing the files in the single instance store is performed by an agent running on the target virtual machine that is to be updated. In other embodiments, an agent on one of the other virtual machines (312-1, 312-2, 312-N) can be nominated a "branch reflector" for all virtual machines on the entire host server 301 based on virtual infrastructure information. This designated branch reflector will be responsible for creating the local single instance store 305 by downloading the relevant layers from the central server 304 on behalf of other VMs that are residing on the same physical host server. The selection of which agent on which VM is designated to be the branch reflector can also be overridden by the administrator or made otherwise configurable.

When the agent 309 in the target VM 312-1 (or in an agent on a different VM that was nominated to be the branch reflector) detects that a base or application layer needs to be downloaded to the target VM 312-1, the agent 309, downloads from the central server 304 a set of files that are missing in the virtual machine 312-1 (and are not available in the single instance store) and are part of the new base layer or application layer which is being delivered. For example, the agent may download a file "c:\windows\system32\app.dll" that is 3 megabytes (MB) in size. In the embodiments where the downloading is performed by the agent nominated as branch reflector, the branch reflector can provide additional information for each file, such as the list of its blocks and their real (physical) location on the disk (e.g., virtual machine disk (VMDK)).

For each such downloaded file, the agent 309 on the target VM creates a stub file of the same size (e.g., 3 MB). As previously mentioned, the stub file is empty of actual content and only the metadata is marked to indicate that such a file exists. In various embodiments, the stub file(s) can be created in a number of different ways, each of which will be described below.

In one embodiment, the stub file is created in a separate staging area 307. The staging area 307 can be a dedicated, protected file-system folder in the target virtual machine. Following the example above, the agent 309 may create an empty stub file of size 3 MB in the staging area "c:\StagingArea\windows\system32\app.dll" on the virtual machine. No content is written to the stub file, so that the operation of creating the stub file only changes information in the master file table of the file-system. This is a relatively quick operation with little I/O impact. The file's meta-information (e.g. attributes, timestamps, security information, etc.) is set correctly on the file. This should also be a quick operation requiring little I/O resources. The agent 309 also collects the offsets of disk blocks which were allocated for this file on the underlying physical disk (i.e., in the single instance store 305).

Additionally, the agent 309 downloads the registry hives of the base or application layer and creates a merged copy of the corresponding local registry hive of the virtual machine 312-1 with the base or application layer registry hive. This copy is placed in the staging area 307 as well. All of the downloading of necessary files and registry hives can be performed in the background, while the user is using their virtual desktop running on the virtual machine.

Once the downloading is complete, the agent asks the user to restart his machine. When the operating system completes its shut down sequence, instead of restarting the virtual machine, the agent 309 shuts down the machine. The VM is stopped. The agent 309 then informs the host server 301 of the list of empty files and their corresponding block offsets on the disk. The host server 301 keeps a mapping of these virtual disk blocks to the corresponding logical offsets of files or blocks in the host's single instance store 305. The agent 309 then boots the VM and during early boot time, a boot-time agent moves the stub files from the staging area 307 into their designated locations. Following the example above, the agent would move the file "c:\StagingArea\windows\system32\app.dll" into location "c:\windows\system32\app.dll". It should be noted that this operation does not change the allocated blocks for this file on the physical disk, only changes the master file table of the file-system.

In an alternative embodiment, rather than creating the stub file in a separate staging area 307, the stub file can be created directly in-place (i.e., in the appropriate location for the application to run) upon the next boot of the virtual machine. Since the stub files are empty of content, creating all of the necessary stub files would normally not impact the boot time very significantly and this operation can be tolerable to the end user experience.

While as mentioned above, the creation of these stub files is ordinarily not very expensive in terms of I/O, in some cases, the process may nonetheless create a short I/O burst if all of the needed stub files are created at once. In order to prevent or reduce this initial I/O burst, in some embodiments, the I/O incurred in creating the stub files can be distributed over time. Thus, in these embodiments, instead of creating the stub files upfront (either in the staging area or in-place), the stub files can instead be created on-demand, when the directory containing them is first accessed by an application (i.e., by the operating system). By way of example, an application "App" may contain a set of files in a directory, as shown in the Table below:

C:\App
C:\App\f1.txt
C:\App\f2.tx
...
C:\App\fn.txt
C:\App\Subdir
C:\App\Subdir\g1.txt In this example, to distribute the initial I/O burst over a longer period of time, the agent will only create the directory "C:\App" and mark it in a special manner to indicate that this directory is empty of content. Thereafter, once an application tries to open the directory "C:\App", the agent can intercept this directory open request and immediately create the empty stub files (e.g., "f1.txt", "f2.txt" . . . "fn.txt", etc.) before the directory open request is completed. Note that in addition to all of the stub files, the subdirectories of the directory (e.g., "C:\App\Subdir") are created as well, but not any of its children directories (these children would only be created if "C:\App\Subdir" is explicitly accessed subsequently by the application). In this manner, the I/O of creating the stub files is distributed over time and only for directories which are actually accessed—stub files in directories which are never accessed would never be created.

After the stub files (and/or directories) have been created, the boot-time agent may perform another restart of the OS. In alternative embodiments (e.g., embodiments where the stub files are created on-demand), no restart may be necessary. When any process/thread running in the guest OS tries to read a block which was part of any of the empty stub files which were previously created, the host server 301 will transparently provide the block from the single instance store 305. This hooking can be performed at the virtual disk layer 313 of the host server 301. The hooking of these operations is transparent to the OS, as it happens at the disk block level. For example, when the file system driver 306 of the guest operating system installed on the virtual machine 312-1 receives the read operation, it forwards the read operation to the disk driver 311, which is then handled by the virtual disk layer 314. Because the block was previously marked to indicate that the block resides in the single instance store 305, the virtual disk layer 313 transparently provides the requested block from the single instance store 305.

When any process/thread running in the guest OS tries to write a block which was part of any of the empty stub files which were previously created, the host server 301 will write the desired block down to the virtual disk 314 (e.g. VMDK) and remove this block from the mapping which was previously created. Subsequently, any read operations on that block will return data from the newly written block directly, rather than fetching it from the single instance store.

In some embodiments, as an alternative to implementing the file mapping approach described above, an agent designated as the branch reflector can be used to stream the files on-demand to the requesting application running on a different VM on the same host. In these embodiments, the stub files can still be created as offline files in a staging area (or in-place), as previously described. Thereafter, when an application accesses a file, the file access can be intercepted on higher level guest operating system component, such as by a file system mini filter driver or NTFS driver, and the entire file can be streamed on-demand from dedicated branch reflector. Since the branch reflector is local (i.e., resides on the same physical host server as the VM running the application), the streaming will be a memory-only transfer with high speed performance. Furthermore, if the single instance store is maintained in high performance memory (e.g., SSD or RAM), the process of launching the application will be even further improved since the application files are loaded with less latency than conventionally loading the files from disk.

Figure 4:
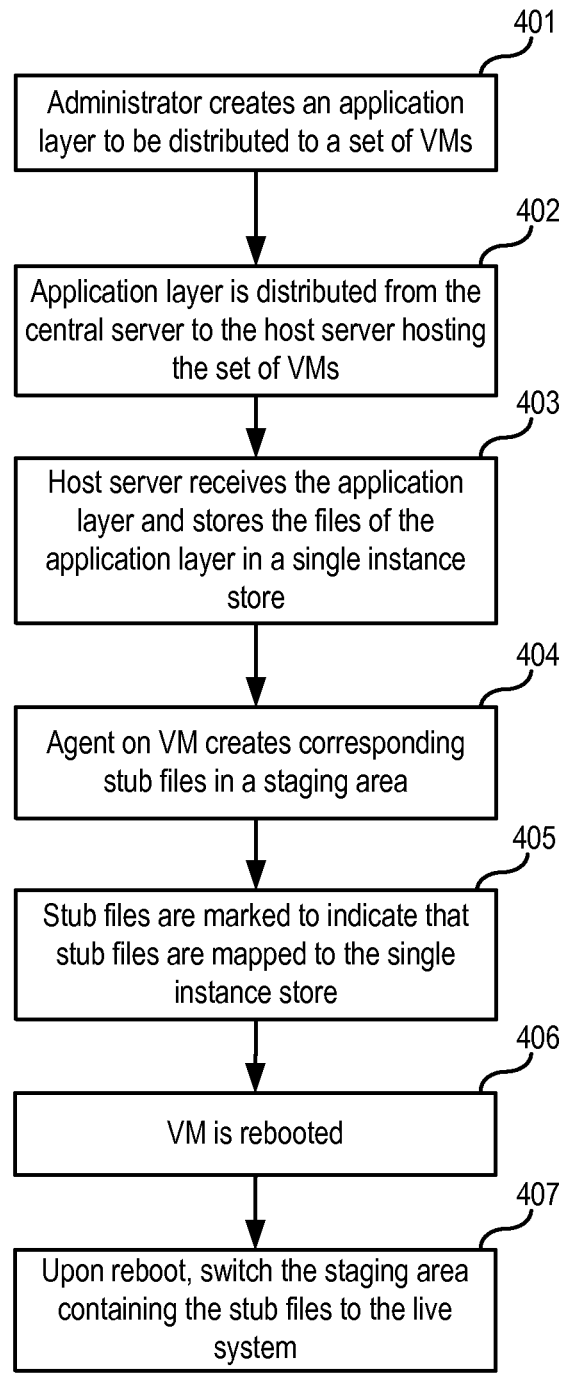
FIG. 4 illustrates an example of a process for applying an update to a virtual machine hosting a virtual desktop, in accordance with various embodiments.

FIG. 4 illustrates an example of a process for applying an update to a virtual machine hosting a virtual desktop, in accordance with various embodiments. As illustrated in operation 401, the administrator creates an application layer or a base layer to be distributed to a set of virtual machines. The application layer or base layer includes all files, registry entries and databases required to apply a change to the user's desktop. Once the administrator has created the application layer or base layer, the administrator may use the console of the central server to apply the application layer or base layer to a set of target virtual machines.

In operation 402, the application layer is distributed from the central server to the host server hosting the target VM. In various embodiments, the host server may also be hosting multiple other virtual machines, which correspond to different users. In operation 403, the host server stores the files of the application layer in a single instance store on the host server. In various embodiments, the single instance store stores each unique copy of the files of the application layer so that the files need not be replicated across all VMs running on the host server.

Once the files have been downloaded from the central server and stored in the single instance store, the agent running on each VM can apply the application layer to the corresponding VM. In operation 404, the agent running on the VM creates a set of stub files (files empty of content) corresponding to the files of the application layer whose content is physically stored in the single instance store. Creating a stub file can be performed by marking the appropriate metadata in the file system to indicate that the file exists there but without copying the actual content of that file to the location. This can save a significant amount of I/O operations because writing the content is typically the major time cost of the overall process. The stub files are created in a separate staging area while the user can continue using their desktop in the virtual machine.

In operation 405, the stub files are marked to indicate that they are mapped to the single instance store. It should be noted that in alternative embodiments, the single instance store can store content on the block level (i.e. store each unique block of content) and in those embodiments, the block would be marked to indicate that it is mapped to the single instance store. In operation 406, the virtual machine is rebooted. Upon rebooting the virtual machine, the agent switches the staging area to the live system folder. At this point, the virtual machine is up and running with the application layer (or base layer) having been applied to the virtual machine.

Figure 5:
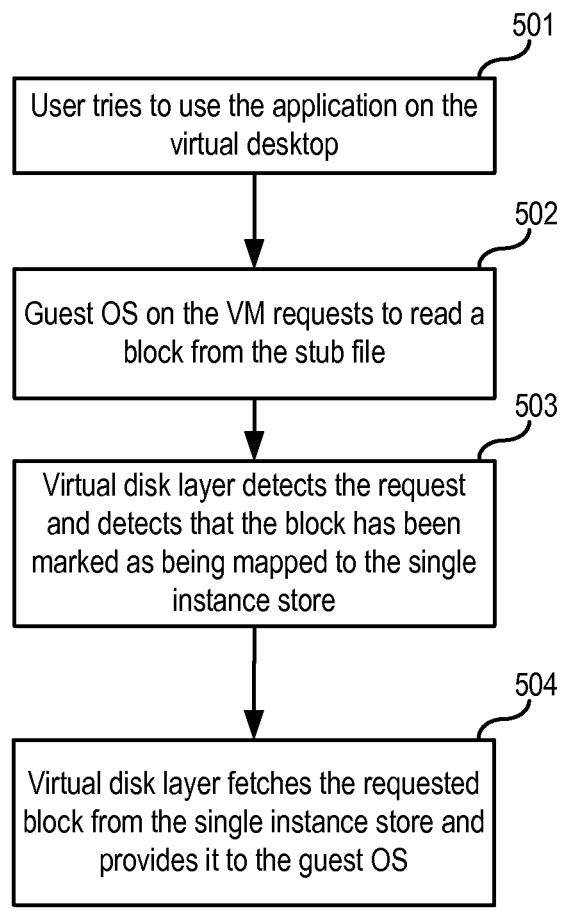
FIG. 5 illustrates an example of a process for reading content from a stub file, in accordance with various embodiments.

FIG. 5 illustrates an example of a process for reading content from a stub file, in accordance with various embodiments. As illustrated in operation 501, once the agent has completed the merge process, a user may utilize the virtual desktop with the change having been applied. For example, as shown in operation 501, the user may execute a new application that has been installed as part of applying the application layer. When the user tries to use the application, the guest operating system installed on the virtual machine may request to read a block of content from the stub file, as shown in operation 502. When the block is requested, the virtual disk layer (e.g., hypervisor) detects the request and determines that the requested block has been marked as being mapped to the single instance store (operation 503). The virtual disk layer then fetches the request from the single instance store and provides the block to the guest operating system, as shown in operation 504. Because the process shown in FIG. 5 is merely mapping blocks in memory without making any network communications, the process can be performed very efficiently, without impacting the experience of the end user.

Furthermore, in some embodiments, the contents of the single instance store can be placed in RAM, flash (SSD) or other efficiently accessible memory, thereby improving performance further. In these embodiments, the performance of launching applications and the operating system in the guest VMs is actually improved because the application files reside in fast memory (e.g., RAM or SSD) and therefore these files will be fetched quicker than conventionally stored application files on disk. Furthermore, in some embodiments where a branch reflector is used to populate the layer data in the single instance store, the branch reflector can also interact with the in-memory cache module in order to index the downloaded data immediately. In some embodiments, the in-memory cache can be enhanced to pin the layer content within the cache to avoid unnecessary eviction (since the application files are likely to be accessed multiple times by multiple virtual machines).

Figure 6:
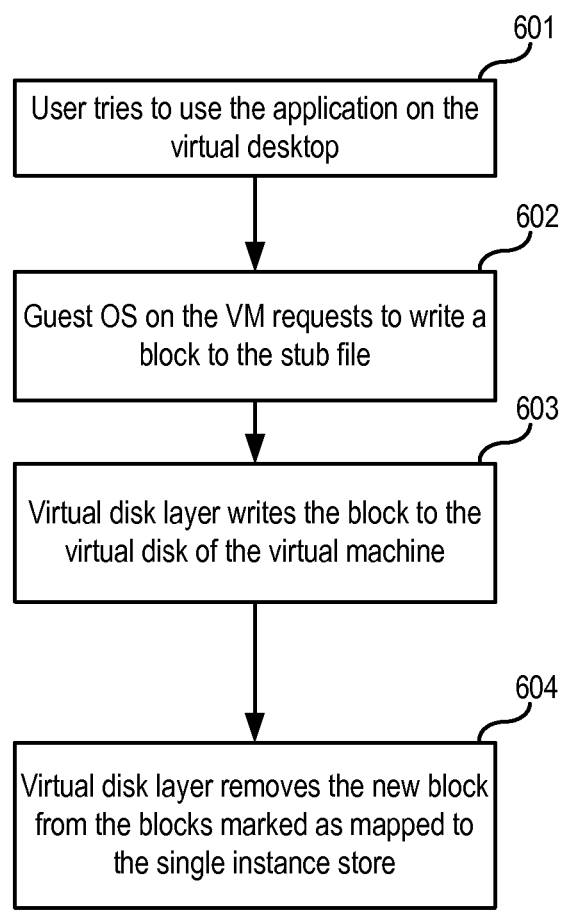
FIG. 6 illustrates an example of a process for writing content to a stub file, in accordance with various embodiments.

FIG. 6 illustrates an example of a process for writing content to a stub file, in accordance with various embodiments. In some embodiments, when the user is using the application (operation 601), the application may attempt to write data to the stub file. When the guest OS receives a write I/O request from the application, it will attempt to write the block to the stub file on the VM, as shown in operation 602. In this case, the virtual disk layer will perform the write directly onto the block in the virtual disk file (e.g., VMDK) of the VM, as shown in operation 603. Additionally, the virtual disk layer will remove the marking of the block to indicate that this particular block is no longer mapped to the single instance store, as shown in operation 604. Thereafter, any read operations that request to read the block, will return the contents of the block in the virtual disk of the VM, rather than the single instance store.

In some embodiments, the updating of the VMs on a host server can be improved using linked clone VMs. A linked clone is a copy of a virtual machine that shares virtual disks with the parent virtual machine (i.e., the VM from which it was copied) in an ongoing manner That is, certain virtual pages of both the parent and the linked clone are mapped to the same physical memory pages. This is sometimes done to conserve disk space and also allows multiple virtual machines to use the same software installation. In the context of updating the virtual desktops of users, the linked clone feature can improve the speed of updating certain VMs on the physical server. For example, this approach can be useful for deployments with homogenous virtual desktops and a relatively small amount of user data. In those cases, a layer update can be done by first updating the parent VM which has multiple clones. The updating of the parent VM simultaneously updates all of the linked clone desktop VMs that are anchored to the parent virtual machine except for updating the user data, which can then be streamed on-demand from the central server. This particular approach assumes that amount of data is relatively small so that network and back-end storage are not a bottleneck.

Figure 7:
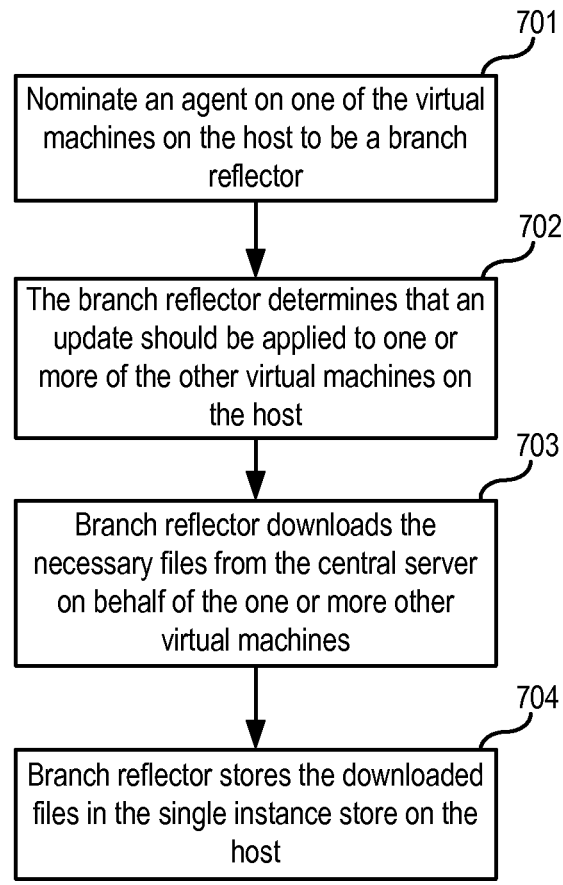
FIG. 7 illustrates an example of a process for utilizing a branch reflector to update a virtual desktop, in accordance with various embodiments.

FIG. 7 illustrates an example of a process for utilizing a branch reflector to update a virtual desktop, in accordance with various embodiments. In operation 701, an agent on one of the virtual machines on the host server is designated to be the branch reflector for all other virtual machines executing on that host. In operation 702, the agent designated to be the branch reflector determines that an update should be applied to one or more of the other virtual machines on the host server. For example, the branch reflector may determine that an application layer should be applied to all of the virtual machines (i.e., virtual desktops) running on the host. In operation 703, the branch reflector downloads the necessary files, registry entries, drivers and other data from the central server. The downloading of these files can be performed over a network connection (e.g., LAN, WAN, etc.). In operation 704, the branch reflector stores the downloaded files in a single instance store. In various embodiments, the single instance store stores each unique version of the files (or blocks) across all of the virtual machines on the host server device. Once the files have been downloaded and stored in the single instance store, the branch reflector can instruct the other agents running on other virtual machines to apply the updates to their respective target VMs. Thereafter, an agent running on the target VM can create the stub files on the target VM, which correspond to the actual files stored in the single instance store. These stub files can be mapped to the files in the single instance store, such that any read request on those stub files will cause the virtual disk layer to return the data from the file in the single instance store. In some alternative embodiments, the files can be streamed on-demand by the branch reflector in response to such requests to read the file, as previously described.

Figure 8:
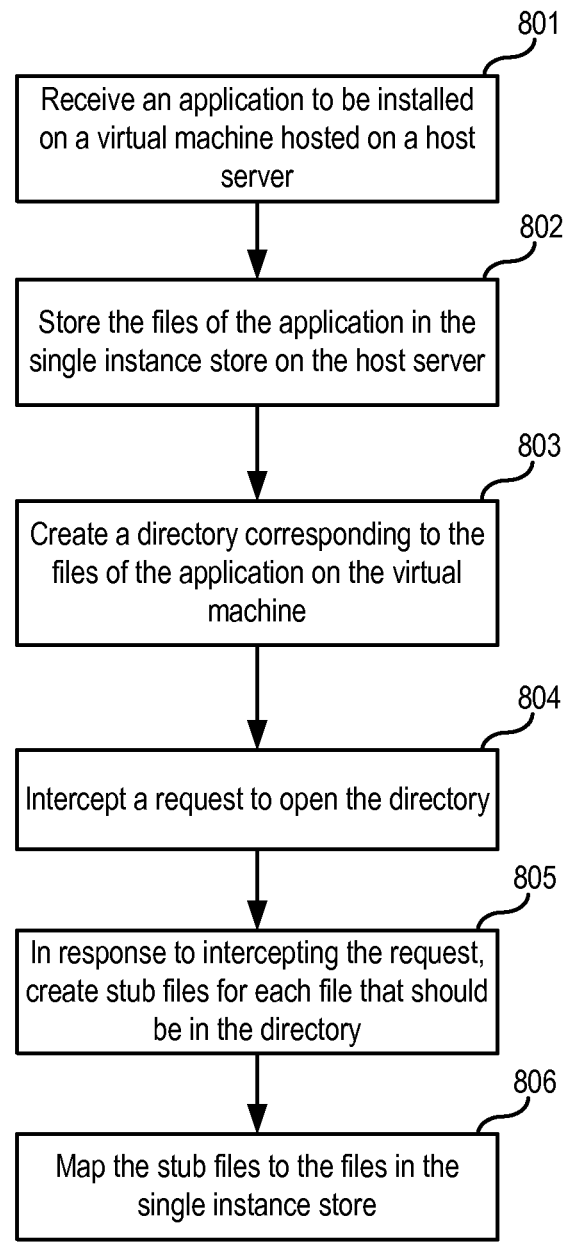
FIG. 8 illustrates an example of a process for distributing the creation of stub files over time, by generating them on-demand, in accordance with various embodiments.

FIG. 8 illustrates an example of a process for distributing the creation of stub files over time, by generating them on-demand, in accordance with various embodiments. In operation 801, an update is received by an agent on the target VM (or by the branch reflector agent). For example, the update may be a new application layer that is to be installed on the virtual desktop. In operation 802, the agent downloads the files and stores the files in the single instance store, as previously described. In operation 803, the agent creates a directory corresponding to the application that is to be installed. In one embodiment, the directory is empty of content and does not contain any stub files. Thereafter, the operating system can intercept a request to open the directory, as shown in operation 804. For example, the request may be intercepted by a file system mini filter driver or other component of the guest operating system at the time when an application requests to open the directory. In response to intercepting the request, the agent creates stub files for each file that should be included in the directory, as shown in operation 805. Additionally, in operation 806, the agent can map the stub files to the actual files stored in the single instance store. Subsequently all read requests will return the data from the single instance store, as previously described.

Figure 9:
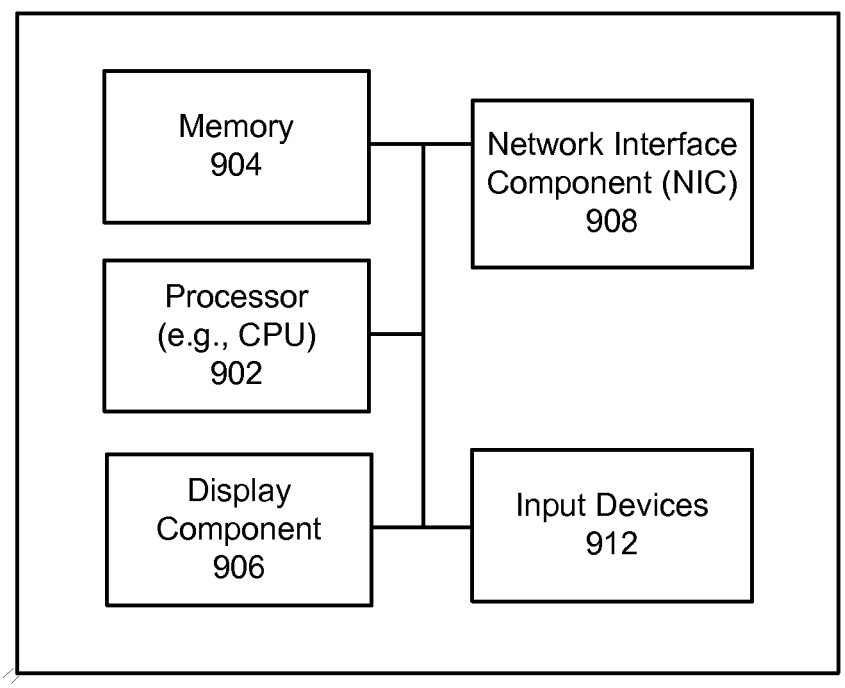
FIG. 9 illustrates an example of some general components of a computing device, in accordance with various embodiments.

FIG. 9 illustrates an example of some general components of a computing device, in accordance with various embodiments. In this particular example, the device includes one or more processors (e.g., central processing units (CPUs) 902 for executing instructions that can be stored in physical memory component 904. The memory component 904 can include many types of memory, data storage, or non-transitory computer-readable storage media, such as random access memory (RAM) storing program instructions for execution by the processor 902, a separate form of storage for images or data, a removable memory for sharing information with other devices and the like. The memory component 904 typically can further comprise a display component 906, such as a monitor, a touch screen, liquid crystal display (LCD), or the like. In various embodiments, the computing device will include at least one input device 908 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 908 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information, such as raw data or corresponding virtual machine disk (VMDK) container may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for virtual desktop image management, the system comprising:
    a central server storing a set of updates to be applied to a plurality of virtual machines, each of the set of updates including one or more of: files, registry entries, or drivers;

a host server device hosting the plurality of virtual machines, the host server device connected to the central server via a communication connection, the host server device further including:
  a first virtual machine including a first agent nominated to be a branch reflector for all of the plurality of virtual machines hosted on the host server device;
  a second virtual machine that is to be updated with at least one of the set of updates from the central server, the second virtual machine including a second agent;
  wherein the first agent on the first virtual machine is configured to (a) determine that an update is to be applied to the second virtual machine, (b) download the files, registry entries and drivers from the central server on behalf of the second virtual machine (c) store the files, registry entries and drivers in a single instance store on physical storage associated with the host server, and (d) provide an instruction to the second agent to apply the update to the second virtual machine by creating one or more stub files; and
  wherein the one or more stub files are created on the second virtual machine corresponding to at least some of the files, registry entries in the single instance store, such that a request to read the one or more stub files returns content from the single instance store.

2. The system of claim 1, wherein the update is configured to install an application on the second virtual machine.

3. The system of claim 2, wherein the application issues the request to read the one or more stub files, said request intercepted by a filter driver on a guest operating system on the second virtual machine.

4. The system of claim 3, wherein in response to the intercepted request to read the one or more stub files on the second virtual machine, the first agent nominated to be the branch reflector on the first virtual machine is configured to stream the content from the single instance store to the second virtual machine.

5. The system of claim 1, wherein the single instance store is in a content-based read cache residing in at least one of: random access memory (RAM) or a solid state drive (SSD) on the host computing device.

6. The system of claim 5, wherein the first agent nominated to be the branch reflector on the first virtual machine is configured to interact with the content-based read cache in order to index the data of the update immediately after downloading the update from the central server.

7. The system of claim 5, wherein content of the update is pinned within the content-based read cache.

8. A method for desktop image management, said method comprising:
  nominating a first agent on a first virtual machine hosted on a host server device to be a branch reflector for a plurality of virtual machines hosted on the host server device, the host server device connected to a central server that stores a set of updates to be applied to a plurality of virtual machines, each of the set of updates including one or more of: files, registry entries, or drivers;
  determining, by the first agent on the first virtual machine, that at least one of the set of updates should be applied to a second virtual machine hosted on the host server device, the second virtual machine including a second agent;
  downloading an update including the files registry entries and drivers from the central server by the first agent on the first virtual machine;
  storing the update in a single instance store on the host server device by the first agent on the first virtual machine;
  providing an instruction from the first agent to the second agent to apply the update to the second virtual machine by creating one or more stub files; and
  creating the one or more stub files by the second agent on the second virtual machine corresponding to at least some of the files, registry entries and drivers in the single instance store, wherein a request to read the one or more stub files on the second virtual machine returns content from the single instance store.

9. The method of claim 8, wherein the update is configured to install an application on the second virtual machine.

10. The method of claim 9, wherein the application issues the request to read the one or more stub files, said request intercepted by a filter driver on a guest operating system on the second virtual machine.

11. The method of claim 10, wherein in response to the intercepted request to read the one or more stub files on the second virtual machine, the first agent nominated to be the branch reflector on the first virtual machine is configured to stream the content from the single instance store to the second virtual machine.

12. The method of claim 8, wherein the single instance store is in a content-based read cache residing in at least one of: random access memory (RAM) or a solid state drive (SSD) on the host computing device.

13. The method of claim 12, wherein the first agent nominated to be the branch reflector on the first virtual machine is configured to interact with the content-based read cache in order to index the data of the update immediately after downloading the update from the central server.

14. The method of claim 12, wherein content of the update is pinned within the content-based read cache.

15. A non-transitory computer readable storage medium comprising one or more sequences of instructions, the instructions when executed by one or more processors causing the one or more processors to execute the operations of:
  nominating a first agent on a first virtual machine hosted on a host server device to be a branch reflector for a plurality of virtual machines hosted on the host server device, the host server device connected to a central server that stores a set of updates to be applied to a plurality of virtual machines, each of the set of updates including one or more of: files, registry entries, or drivers;
  determining, by the first agent on the first virtual machine, that at least one of the set of updates should be applied to a second virtual machine hosted on the host server device, the second virtual machine including a second agent;
  downloading an update including the files registry entries and drivers from the central server by the first agent on the first virtual machine;
  storing the update in a single instance store on the host server device by the agent on the first virtual machine;
  providing an instruction from the first agent to the second agent to apply the update to the second virtual machine by creating one or more stub files; and
  creating the one or more stub files by the second agent on the second virtual machine corresponding to at least some of the files, registry entries and drivers in the single instance store, wherein a request to read the one or more stub files on the second virtual machine returns content from the single instance store.

16. The non-transitory computer readable storage medium of claim 15, wherein the update is configured to install an application on the second virtual machine.

17. The non-transitory computer readable storage medium of claim 16, wherein the application issues the request to read the one or more stub files, said request intercepted by a filter driver on a guest operating system on the second virtual machine.

18. The non-transitory computer readable storage medium of claim 17, wherein in response to the intercepted request to read the one or more stub files on the second virtual machine, the first agent nominated to be the branch reflector on the first virtual machine is configured to stream the content from the single instance store to the second virtual machine.

19. The non-transitory computer readable storage medium of claim 15, wherein the single instance store is in a content-based read cache residing in at least one of: random access memory (RAM) or a solid state drive (SSD) on the host computing device.

20. The non-transitory computer readable storage medium of claim 19, wherein the first agent nominated to be the branch reflector on the first virtual machine is configured to interact with the content-based read cache in order to index the data of the update immediately after downloading the update from the central server.

* * * * *